United States Patent [19]

Bertolasi

[11] 4,193,022
[45] Mar. 11, 1980

[54] ANALOG/DIGITAL NUMERICAL CONTROL SYSTEM

[75] Inventor: Robert B. Bertolasi, Rockford, Ill.

[73] Assignee: Kelsey-Hayes Company, Romulus, Mich.

[21] Appl. No.: 889,069

[22] Filed: Mar. 22, 1978

[51] Int. Cl.² ............................................. G05B 11/18
[52] U.S. Cl. ..................................... 318/592; 318/596; 318/612
[58] Field of Search ............... 318/592, 593, 594, 596, 318/612

[56] References Cited

U.S. PATENT DOCUMENTS

| | | | |
|---|---|---|---|
| 2,921,247 | 1/1960 | Morrison | 318/596 |
| 3,248,622 | 4/1966 | Kelling | 318/594 |
| 3,665,500 | 5/1972 | Lewis et al. | 318/596 |
| 3,670,228 | 6/1972 | Crosby | 318/594 |
| 3,723,843 | 3/1973 | Pearson | 318/594 X |
| 3,749,997 | 7/1973 | Cohen et al. | 318/592 |
| 3,995,206 | 11/1976 | Aronstein et al. | 318/593 |

Primary Examiner—B. Dobeck

[57] ABSTRACT

An analog/digital numerical control system that utilizes analog techniques to process large scale (macro) differences and digital techniques to process small scale (micro) differences. In this manner, advantage is taken of the respective virtues of both analog and digital processing techniques while avoiding the disadvantages associated with the exclusive use of either approach. In addition, a novel tach responsive braking generator is disclosed for particular use in controlling the positioning of high mass heads that is adapted to provide dynamic braking of the controlled machine assembly to accomplish proper positioning without "hunting".

31 Claims, 4 Drawing Figures

Fig. 2a.

ANALOG/DIGITAL NUMERICAL CONTROL SYSTEM

BACKGROUND AND SUMMARY OF THE INVENTION

The present invention relates to a numerical control system and in particular to a system that combines the best attributes of both analog and digital numerical control techniques.

The use of numerical control systems and in particular computerized numeric control to control the movement of machining operations has within recent years become quite widespread. Numerical control systems fall into two general categories: open loop systems and closed loop systems. In open loop systems, the real (actual) position of the head assembly being controlled must be determined by counting the number of counts (increments) above or below a zero position. Hence, the wear of all drive line components becomes a factor in positioning accuracy, requiring elaborate support systems to "compensate" for mechanical degradation. However, open loop systems have usually enjoyed a cost advantage over closed loop system since the added expense of such support systems is generally more than offset by the additional hardware, in the form of absolute encoders and precision date racks, required to close the loop.

A second dilemma facing the numerical control system designer has been whether to employ analog or digital circuitry for prime processing. On the one hand, basic analog controls are relatively straight forward, however the required degree of accuracy can only be obtained with costly, highly sensitive components and complex compensating circuitry to overcome the inherent drift problems in analog signals caused by changes in temperature, supply voltage, etc. With digital circuitry, on the other hand, accuracy is readily attainable, however, a massive array of digital logic circuits is required in order to accommodate large scale control.

Accordingly, it is the primary purpose of the present invention to provide an extremely accurate and cost effective closed loop numerical control system that combines the best attributes of both analog and digital control. Specifically, the present hybrid system gathers positional information in absolute form via an encoder and compares the information to the desired position digitally. The resulting digital signal is then processed in two distinct operations. For macro differences (large scale), the most significant bits of the digital signal are converted to an analog command by a "state-of-the-art" digital-to-analog converter chip. The D-to-A converter used may have relatively poor temperature and accuracy specifications in exchange for a very low cost. The poor specifications, however, are irrelevant since the functional responsibility of the device is macro (large scale) processing. For micro (small scale) differences, the least significant bits in the digital signal are processed by a novel network of polarity switched analog gates. In particular, each analog gate is fed with a polarity signal that determines the desired direction of movement. The control terminal of each gate is controlled by one of the least significant bit lines from the digital signal, and the output of each gate is tied to a current limiting (or voltage proprotioning) resistance. The various resistance lines are then combined to form a single (micro) analog command. The net result of the present invention is that expensive analog components are avoided and the amount of digital circuitry is minimized.

In addition, the preferred embodiment of the present invention herein includes a novel tach responsive braking generator circuit to accomplish the positioning of high mass heads without "hunting". Basically, the circuit comprises a double integrating tachometer that is responsive to the rate of change of the least significant bit in the output signal from the encoder to produce a signal whose magnitude is directly related to the velocity of the head assembly. The velocity signal is then provided through a level shifter to a bipolar output stage whose output polarity is opposite that of the motive drive signal. In operation, if during deceleration of the head assembly the encoder indicates that the velocity is not falling off at an appropriate rate, the tach responsive braking generator circuit is adapted to produce a reverse polarity braking signal that when combined with the motive drive signal serves to dynamically brake the head assembly.

Additional objects and advantages of the present invention will become apparent from a reading of the detailed description of the preferred embodiment which makes reference to the following set of drawings in which:

BRIEF DESCRIPTION OF THE DRAWINGS

FIG. 3 is a block diagram of a system modification for use when more than one head assembly is being controlled on the same track.

DETAILED DESCRIPTION OF THE PREFERRED EMBODIMENT

Figure 1:
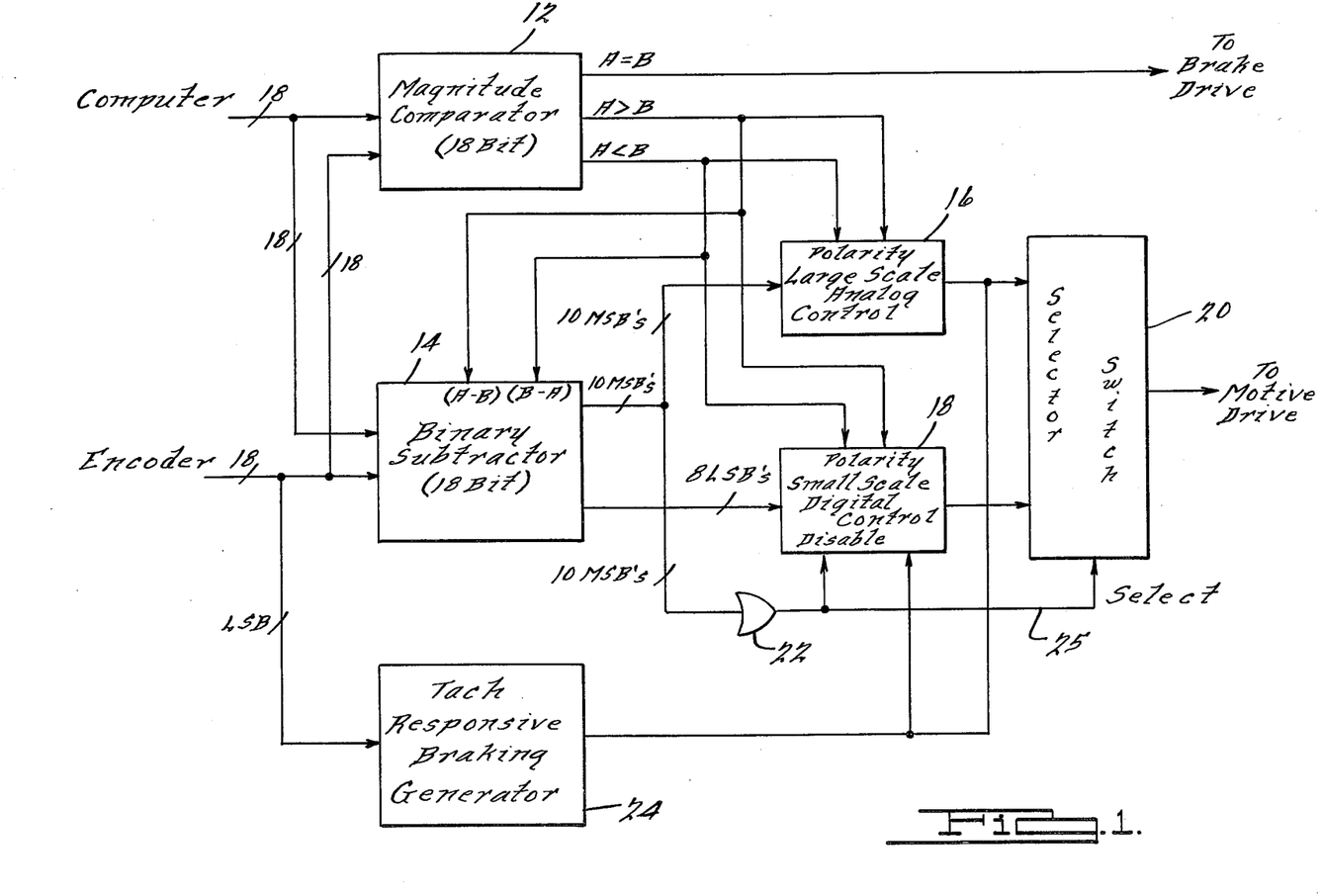
FIG. 1 is a block diagram of an analog/digital numerical control system according to the present invention.

Referring to FIG. 1, a block diagram of a closed-loop analog/digital numerical control system according to the present invention is shown. The preferred system disclosed herein is an 18-bit computerized numerical control system. In particular, the control system includes a computer for determining the desired position of a machine head assembly and an absolute encoder physically connected to the head assembly for providing feedback information indicating the actual position of the head assembly. The 18-bit parallel digital output signals from both the computer and encoder are provided to a magnitude comparator circuit 12 that is adapted to compare the two digital signals to determine if the head assembly is in the desired position and if not, whether it is up scale or down scale from the desired position. Specifically, if the head assembly is in the desired position, a HI output signal is provided on the "A=B" line to a brake drive that is effective to lock the head assembly in position. A HI output signal is provided on the "A>B" line when the head assembly is down scale from the desired position, and a HI output signal is provided on the "A<B" line when the head assembly is up scale from the desired position.

The "A>B" and "A<B" output lines are provided to a binary subtractor circuit 14 which is also connected to receive the 18-bit parallel output signals from the computer and encoder. The two output signals from the magnitude comparator circuit 12 tell the subtractor circuit 14 whether to subtract the encoder signal from the computer signal or the computer signal from the encoder signal. Accordingly, the output signal from the binary subtractor circuit 14 comprises the absolute value of the magnitude difference between the computer and encoder output signals.

In the preferred embodiment herein, the ten most significant bits in the output signal from binary subtractor 14 are provided to a large scale analog control 16 generally comprising a D-to-A converter. The analog control 16 is adapted to produce an analog output signal that is proportional to the binary equivalent of the ten-bit digital signal provided to its input. The polarity of the analog output signal from converter circuit 16 is determined by the "A>B" and "A<B" output signals from magnitude comparator 12.

The eight least significant bits in the output signal from binary subtractor 14 are provided to a novel small scale digital control network 18. As will subsequently be seen, digital control 18 includes eight analog gates that are digitally controlled by the output lines from binary subtractor 14. The analog gates are commonly fed with a polarity voltage determined by the "A>B" and "A<B" output signals from magnitude comparator 12. Each of the outputs from the analog gates is tied in common through a plurality of current limiting or voltage proportioning resistances. The resulting discrete increment signal, along with the output signal from D-to-A converter 16, are provided to a selector switch 20 whose output is connected to the motive drive system. The selector switch determines whether the motive drive is to be controlled by the output signal from the D-to-A converter 16 or the gating network 18; i.e., whether the motive drive is to be controlled by the macro (large scale) or micro (small scale) section of the control circuit. The selector switch 20 makes this determination in accordance with the select signal on line 25 which is produced at the output of a ten-input OR-gate 22. The ten inputs to OR-gate 22 are tied to the ten most significant bits in the output signal from binary subtractor 14. When the output of OR-gate 22 is HI, the motive drive is controlled by the macro section of the control circuit and the gating network 18 of the micro section is disabled. Conversely, when the output of OR-gate 22 is LO, indicating that the ten most significant bits in the encoder signal are equal to the ten most significant bits in the computer signal, the control of the motive drive is transferred to the micro section of the control circuit.

As an anticipated requirement for the control of high mass head assemblies, the preferred embodiment of the present invention herein includes a novel tach responsive braking generator circuit 24 that is adapted to dynamically brake the head assembly in the event the velocity of the head assembly does not fall off at an appropriate rate. In particular, the tach responsive braking generator 24 monitors the velocity of the head assembly by monitoring the rate of change of the least significant bit in the output signal from the encoder. If the braking generator 24 determines that braking is necessary, an appropriate output signal is produced that is opposite in the polarity to the control signals from analog control 16 and digital control 18. The magnitude of the signal produced at the output of braking generator 24 is dependent upon the amount of braking required. Thus, dynamic braking is provided by combining the braking signal with the output signal from analog control 16 when under macro control, and injecting the braking signal into the digital control 18 when under micro control, to decrease the magnitude, and if necessary reverse the polarity, of the control signal provided to the motive drive.

Figure 2A:
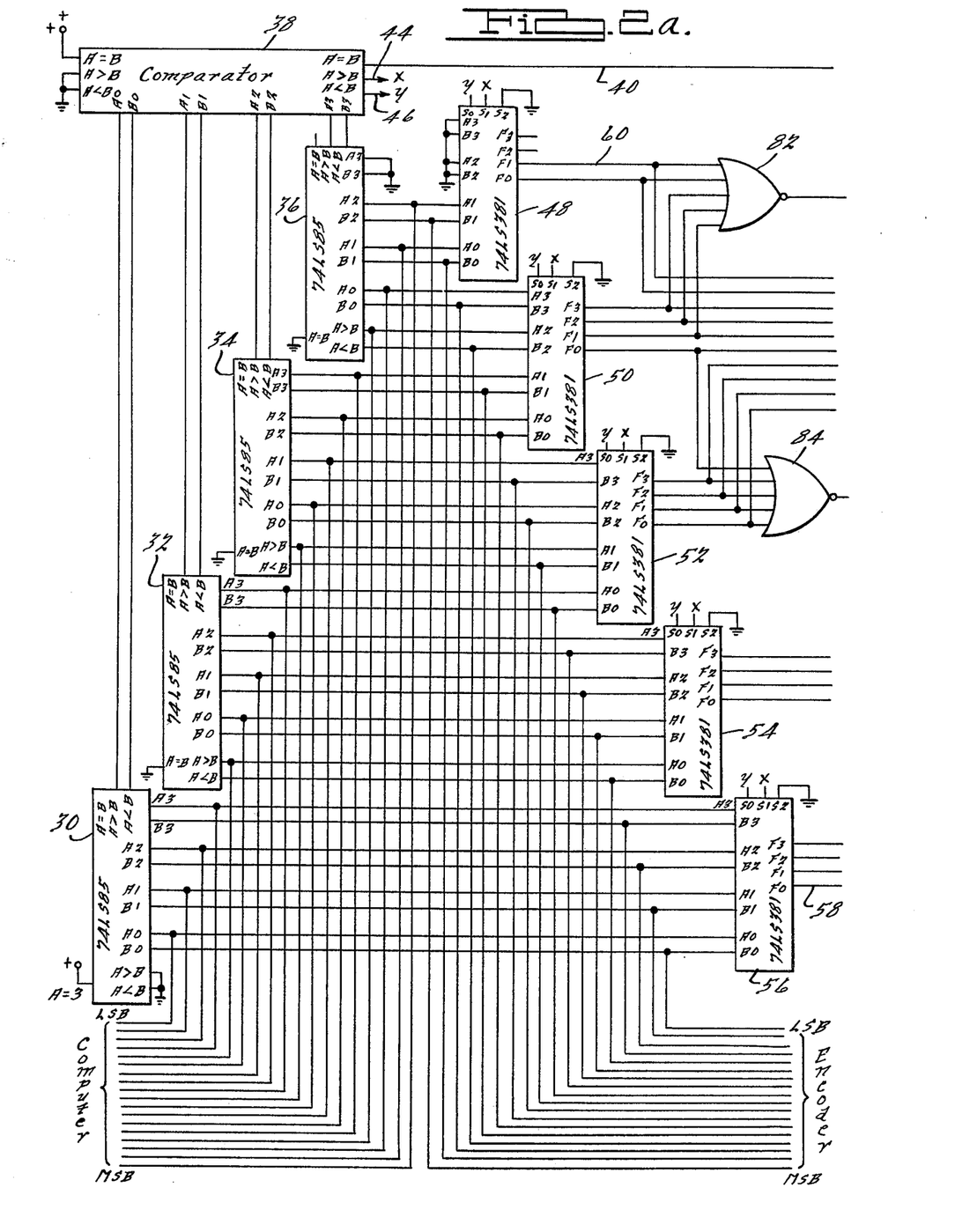
FIGS. 2a and 2b are a circuit diagram of an analog/digital numerical control system according to FIG. 1.
Figure 2B:
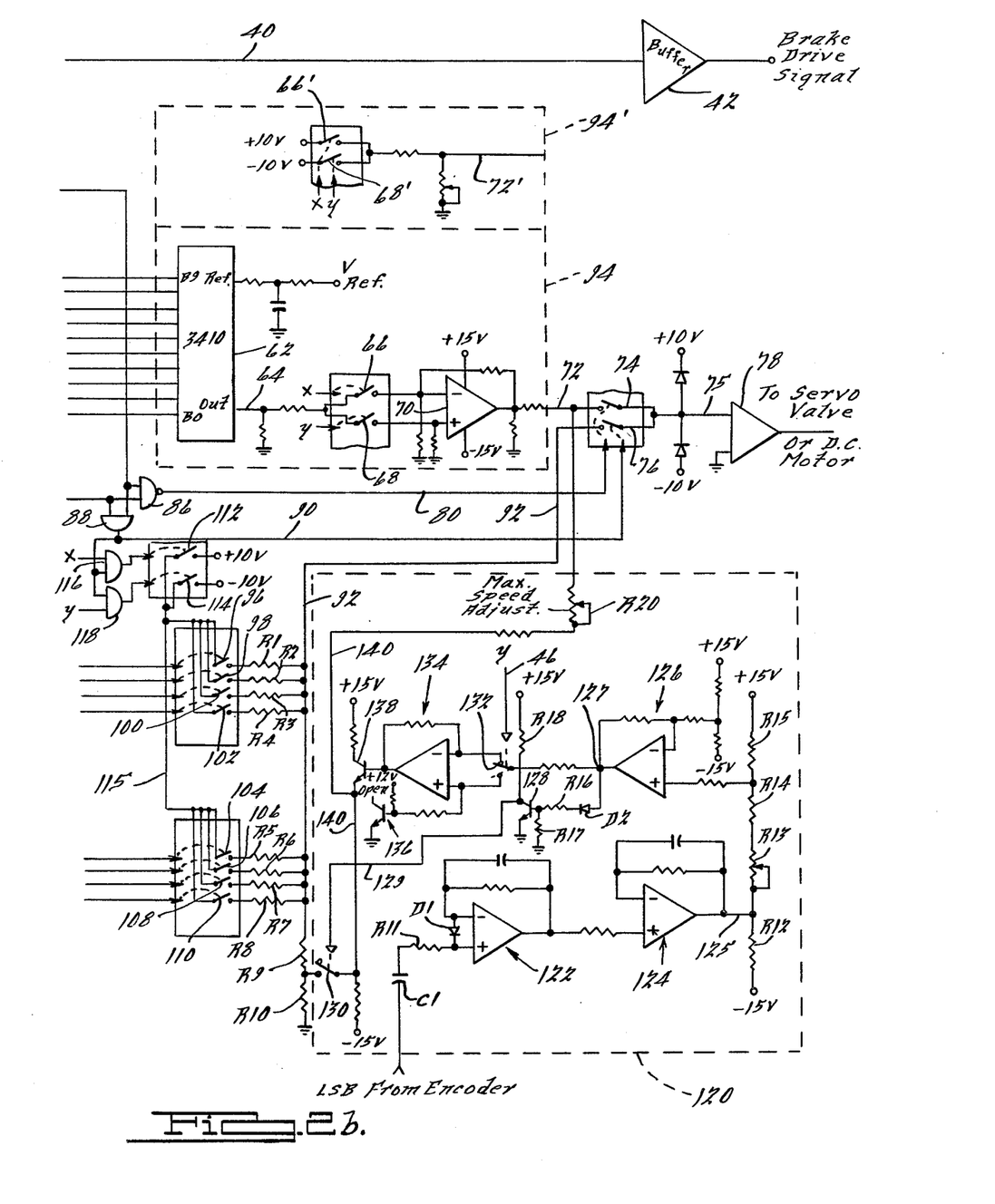
Figure 7:
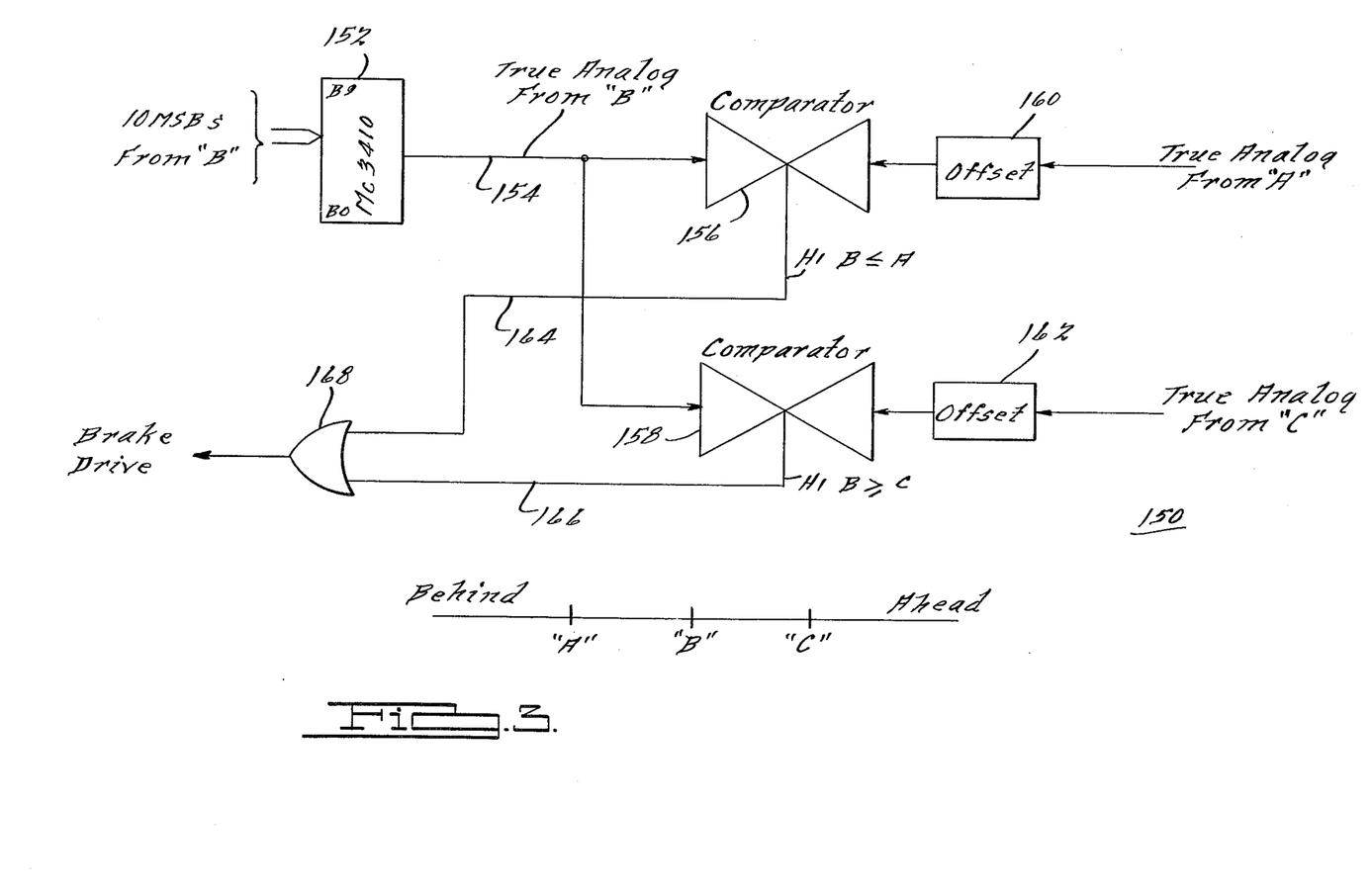

Looking now to FIGS. 2a and 2b, a circuit diagram of a numerical control according to the present invention is shown. As previously noted, the preferred control system is an 18-bit closed-loop computerized numerical control system. The desired position of the head assembly being controlled is defined by the 18-bit digital output signal from the computer and the actual position of the head assembly is defined by the 18-bit digital output signal from the encoder.

The 18-bit parallel output signals from the computer and encoder are provided to a plurality of cascaded digital comparators 30–38 that are adapted to determine whether the encoder output signal is greater than the computer output signal, indicating that the head assembly is up scale from the desired position, less than the computer output signal, indicating that the head assembly is down scale from the desired position, or equal to the computer output signal, indicating that the head assembly is at the desired position. If the two signals are equal, a HI signal is produced at the "A=B" output on line 40 and provided through an output buffer 42 to a brake drive that may be adapted to either physically clamp the head assembly in position or shunt the motivator to prevent any mechanical unbias from affecting the position of the head assembly. If the encoder output signal is not equal to the computer output signal, a HI signal is produced at the appropriate one of either the "A>B" output on line 44 or the "A<B" output on line 46.

The "A>B" output on line 44 and the "A<B" output on line 46 are tied to the "X" (S1) and "Y" (S0) inputs, respectively, of each of a plurality of cascaded binary subtractors 48–56. The binary subtractors 48–56 are also connected to receive the 18-bit digital output signals from the computer and encoder and are adapted to produce an 18-bit output signal equivalent to the absolute value of the difference between the computer output signal and encoder output signal. Specifically, if a HI output signal is produced by comparator 38 at the "A>B" output on line 44, then the binary subtractors 48–56 will subtract the encoder output signal from the computer output signal. Conversely, if a HI output signal is produced by comparator 38 at the "A<B" output on line 46, then the binary subtractors will subtract the computer output signal from the encoder output signal. In addition, when both the "A>B" output on line 44 and the "A<B" output on line 46 are LO—i.e., when the computer output signal and encoder output signal are equal—the binary subtractors 48–56 are automatically adapted to clear their outputs. In the preferred embodiments herein, the F0 output on line 58 from binary subtractor 56 constitutes the least significant bit in the 18-bit output signal and the F1 output on line 60 from binary subtractor 48 comprises the most significant bit.

The ten most significant bits from the outputs of binary subtractor 48–52 are provided to a ten-bit digital-to-analog converter 62. D-to-A converter 62 is adapted to produce a negative analog output signal on line 64 the magnitude of which is proportional to the digital equivalent of the ten-bit signal provided to its inputs. As alluded to previously, the particular D-to-A converter chip 62 selected for use in the preferred embodiment is an extremely inexpensive device, although in exchange therefor, the temperature and accuracy specifications of the chip are relatively poor. However, because the device is being utilized in the preferred embodiment for processing only large scale (macro) differences in the computer and encoder output signals, the variations due to drift in the output signal from the D-to-A converter 62 can be ignored. Consequently, it can be seen that the need for expensive analog components is avoided.

The analog output signal from D-to-A converter 62 is provided to a pair of parallel connected analog switches 66 and 68. The control terminal of analog switch 66 is connected to the "A>B" directional output signal on line 44 and the control terminal of analog switch 68 is connected to the "A<B" directional output signal on line 46. The output terminals of analog switches 66 and 68 are provided to the negative and positive inputs, respectively, of an operational amplifier 70 that is adapted to provide the necessary gain factor to raise the magnitude of the analog signal to an appropriate amplitude range. The function of the analog switches 66 and 68 is to provide the analog signal with the appropriate polarity so that the motivator will drive the head assembly in the proper direction. Specifically, if analog switch 66 is actuated in response to a HI signal on line 44, the converted analog signal on line 64 will be provided to the inverting input of amplifier 70, and thus given a positive polarity. On the other hand, if analog switch 68 is actuated in response to a HI signal on line 46, the converted analog signal on line 64 will be provided to the non-inverting input of amplifier 70, and thus given a negative polarity.

The resulting control signal on line 72 is provided through another analog switch 74 to the output amplifier 78 which drives the motivator. Analog switch 74 is actuated by the signal on line 80 which constitutes the output of an equivalent ten-input OR-gate comprised of NOR-gates 82 and 84 and NAND-gate 86. The output signal from NAND-gate 86 on line 80 will always be HI as long as all of the ten most significant bits in the output signal from the encoder are not equal to the ten most significant bits in the output signal from the computer; i.e., as long as the head assembly has not converged sufficiently upon the desired position to warrant switching from macro control over to micro control. However, when all of the ten most significant bits in the output signals from the encoder and computer are equal, the output signal from NAND-gate 86 on line 80 will go LO and the output signal from AND-gate 88 on line 90 will go HI. As will be seen, the HI signal on line 90 is effective to actuate analog switch 76 which applies the output control signal from the micro section on line 92 to the driver amplifier 78.

At this point, it should be noted that the magnitude of the control signal provided on line 75 is not only indicative of the distance between the actual location of the head assembly and desired location, but is also determinative of the speed at which the head assembly will be driven. In other words, for a given control circuit and machine assembly, a fixed distance versus velocity relationship will exist. Thus, a +8.0 volts output signal on line 75, for example, will correspond to a predetermined velocity rate at the head assembly. The distance versus velocity relationship selected for a particular system will depend upon the mass of the head assembly, the degree of accuracy required, and the maximum speed at which the head assembly will be driven. Accordingly, if a high mass head assembly, for example, is being controlled which cannot be brought to a complete stop from full speed within a distance shorter than one foot, then a relatively gradual slow-down rate will be required. Moreover, if it is further assumed that positional accuracy is required within 0.001 inches, then the macro section of the control circuit will be required to provide speed control since the head assembly must commence slow-down from maximum speed before it has converged sufficiently to shift to micro control. For such a system, the version of the macro control section described above and identified at 94 should be used. However, if the mass of the head assembly and the accuracy requirements of the system are such that the head assembly can always be driven at full speed while under macro control, then the alternative version of the macro control section identified at 94' is preferred. The embodiment of the macro control section shown at 94' does not provide speed control and therefore does not require a D-to-A converter. Rather, as long as the head assembly is under macro control—i.e., a HI output signal is present on line 80—the head assembly can be driven at its maximum speed. Consequently, the parallel connected analog switches 66' and 68' can be connected directly to a ±10 volts supply.

Turning now to the micro (small scale) section of the present numerical control system, the eight least significant bits in the 18-bit output signal produced by binary subtractors 48–56 are processed by a novel polarity switched digitally controlled analog gating network. Although in the preferred embodiment herein eight of the eighteen total bits are used for the micro section and ten of the bits are used for the macro section, this ratio may be varied in accordance with the specific requirements of a particular system. The eight parallel outputs from binary subtractors 54 and 56 are provided to the control terminals of a corresponding number of analog switches 96–110. The inputs to analog switches 96–110 are tied in common to the outputs of another pair of analog switches 112 and 114 that have their inputs connected to a +10 volts source and a −10 volts source, respectively. The control terminals of analog switches 112 and 114 are controlled by the two directional output signals on lines 44 and 46 from comparator 38. Accordingly, it can be seen that the "A>B" and "A<B" output signals from comparator 38 control the polarity of the signal provided on line 115 to each of the inputs of analog switches 96–110, which as will be seen determines the polarity of the motor drive control signal generated by the micro section.

In addition, it will be noted that the actuation of analog switches 112 and 114 is further controlled by the output of AND-gate 88 which is provided to another pair of AND-gates 116 and 118. AND-gate 88, it will be recalled, is adapted to produce a HI output signal when all of the ten most significant bits in the output signal from the encoder are equal to the ten most significant bits in the output signal from the computer. Thus, as long as the head assembly is under the control of the macro section, the output of AND-gate 88 will be LO, thereby disabling AND-gates 116 and 118 and preventing the actuation of analog switches 112 and 114. However, when control of the head assembly is to be switched to the micro section, the output of AND-gate 88 will go HI, thereby enabling AND-gates 116 and 118 and permitting the actuation by the "A>B" and "A<B" directional control signals of analog switches 112 and 114.

The outputs of analog switches 96 and 110 are connected to a corresponding number of scaling resistors R1-R8 which are all tied in common to the midpoint of a voltage divider network that further includes resistors R9 and R10. The values of scaling resistors R1–R8 are selected to reflect the relative binary weight of each of the eight least significant bits in the subtractor signal. In other words, the value of resistor R2 is twice the value of resistor R1, the value of R3 is four times the value of resistor R1, and so on up to resistor R8 which is 128 times the value of resistor R1. In the preferred embodiment resistor R9 is eight to sixteen times the value of resistor R1 and resistor R10 is equal to the value of resistor R1. Thus, since the lower half of the voltage divider network is fixed, it can be seen that the effective value of the upper half of the voltage divider network, and hence the magnitude of the output signal produced on line 92, is digitally controlled by the eight least significant bits in the subtractor signal. In other words, the output control signal from the micro section on line 92 comprises a highly accurate incremental signal having one of 512 discrete levels between ±10 volts (ignoring for the moment the effect of the tach responsive braking generator circuit 120 to be subsequently described), the precise level depending upon the logic states of the eight least significant bits in the digital output signal from subtractors 54 and 56.

As previously noted, the output control signal from the micro section on line 92 is provided to the driver amplifier 78 through analog switch 76, which is actuated by the same HI signal on line 90 from the output of AND-gate 88 that enables the digitally controlled analog gating network. The HI signal at the output of AND-gate 88, it will be recalled, is produced simultaneously with the production of a LO signal on line 80 from the output of NAND-gate 86, which is effective to open analog switch 74. Accordingly, it can be seen that the transfer of control from the macro section to the micro section as the head assembly converges on the desired position occurs instantaneously with no "gaps" in the control signal provided to the motive drive.

Additionally included in the preferred embodiment of the present numerical control system is a novel tach responsive braking generator circuit 120 for improving the control of high mass heads. In particular, the braking generator circuit 120 is adapted to insure proper positioning of the head assembly without "hunting" by providing a dynamic brake of the head assembly when it appears from the rate of deceleration that the head assembly is going to overshoot the desired position. Basically, this is accomplished by monitoring the least significant bit (LSB) in the output signal from the encoder and producing a braking signal opposite in polarity to the motive drive control signal when the frequency of the signal on the LSB line indicates that the head assembly is not decelerating at an appropriate rate. The LSB from the encoder is utilized as the input signal to the braking generator circuit 120 because it is the fastest moving bit and therefore provides the best indication of the speed of the head assembly.

Looking to the circuit diagram, the LSB line from the output of the encoder is initially provided to a frequency doubler network comprised of capacitor C1, resistor R11, and diode D1. The resulting signal is then fed through series connected first and second integrator circuits 122 and 124 that are adapted to produce a bipolar analog signal on line 125 the magnitude of which is directly related to the frequency of the signal on the LSB line from the encoder. The signal on line 125 is then supplied to a scaling network comprised of resistors R12–R15 and a level shifter circuit 126 that are adapted to convert the bipolar analog signal at the output of integrator 124 to a corresponding unipolar analog signal at node 127. The signal at the output of level shifter 126 is connected to the input terminal of a double-pole analog switch 132 which has its control terminal tied to the "Y" or "A<B" output from comparator 38. One of the output terminals of analog switch 132 is connected to the inverting input of an operational power amplifier circuit 134 and the other output terminal of analog switch 132 is connected to the non-inverting input of power amplifier circuit 134. The non-inverting input of amplifier circuit 134 is also tied to a compensating network 136 to be subsequently described. When the "Y" signal on line 46 from the output of comparator 38 is HI, the unipolar analog signal at node 127 is provided to the inverting input of amplifier circuit 134. Conversely, when the "Y" signal on line 46 is LO, the unipolar analog signal at node 127 is provided to the non-inverting input of amplifier circuit 134.

The output of power amplifier circuit 134 is provided to the base of a transistor 138 which has its collector and emitter terminals tied to a +15 volts and −15 volts respectively. The output off the emitter of the transistor 138 on line 140 is connected through another analog switch 130 to the midpoint of resistors R9 and R10 in the voltage divider network of the micro control section described previously, and through a potentiometer R20 to the output line 72 of the macro control section. The braking signal produced on line 140 comprises a bipolar analog signal whose magnitude is directly proportional to the magnitude of the unipolar signal at node 127 which in turn is directly proportional to the frequency of the signal on the LSB line from the encoder. However, due to the polarization of the braking signal resulting from the arrangement of analog switch 132 and power amplifier circuit 134, the polarity of the braking signal on 140 will always be opposite the polarity of the micro section control signal on line 92 and the macro section control signal on line 72. Thus, if while under the control of the macro section the head assembly converges too rapidly, (i.e., the deceleration rate of the head assembly does not follow the reductions in the magnitude of the motive drive signal), the tach responsive braking generator circuit 120 will produce a reverse polarity signal on line 140 that when combined with the macro control signal on line 72 will result in a reduction in the magnitude of the control signal on line 75 provided to the driver amplifier 78, and may even under certain circumstances cause a reversal in the polarity of the motive drive signal when more effective braking action is required. Accordingly, it can be seen that the magnitude of the signal on line 140 and hence the degree of braking action, is automatically adjusted to provide the amount of braking necessary to prevent the head assembly from overshooting the desired position.

To provide braking action when the head assembly is being controlled by the micro section, the braking signal on line 140 is provided as noted to the midpoint of resistors R9 and R10. The reverse polarity of the braking signal relative to the micro control signal on line 92 has the effect of reducing the value of resistor R10 which, due to the voltage divider arrangement of resistors R1–R10, results in a proportionate decrease in the magnitude of the micro control signal on line 92. The degree of effective reduction in the value of resistor R10 will of course depend upon the magnitude of the braking signal. Thus, it can be seen the braking generator circuit 120 is adapted to provide dynamic braking action to both the macro and micro sections of the control system.

To insure that slight shifts in the analog braking signal due to variations in temperation, voltage, etc., do not affect the accuracy of the micro control section, an electronic switching circuit is included that is adapted to disconnect the braking generator circuit 120 from the micro section whenever the magnitude of the braking signal falls below a predetermined level. Specifically, the unipolar analog signal from the output of level shifter 126 is also provided through a diode D2 and a voltage divider comprised of resistors R16 and R17 to the base of switching transistor 128. The emitter of transistor 128 is tied to ground and its collector is connected to +15 volts through resistor R18 and to the control terminal of analog switch 130. When transistor 128 is conducting, the output signal on line 129 is LO and analog switch 130 is closed. However, when the magnitude of the signal at node 127 drops below approximately 1 volt, the bias signal is removed from the base of transistor 128 rendering it non-conductive. With transistor 128 turned off, a HI signal is provided on line 129 which opens analog gate 130 and disconnects the braking generator circuit 120 from the micro control section. It will be noted, however, that it is not necessary to disconnect the braking generator circuit 120 from the macro control section under such circumstances because small variations in the macro control signal can be ignored.

Referring now to FIG. 3, a block diagram of an auxiliary circuit 150 for controlling multiple head assemblies is shown. The purpose of the auxiliary circuit 150 is to prevent an inadvertent collision between two or more head assemblies operating on the same track or table. In the example illustrated in FIG. 3, it is assumed that three head assemblies "A", "B" and "C" are operating on the same line with machine "B" located intermediate machines "A" and "C".

The ten most significant bits in the output signal from the encoder associated with machine "B" are provided to a digital-to-analog converter 152 similar to the D-to-A converter 62 described in FIG. 2b. The corresponding analog signal produced at the output of D-to-A converter 152 on line 154 is referred to as the "true analog" signal from machine "B". The "true analog" signal from machine "B" is provided to one of the inputs to each of two comparators 156 and 158. The other input to comparator 156 is connected to the "true analog" signal from machine "A", which is generated in the same manner as the "true analog" signal from machine "B", and the other input to comparator 158 is connected to the "true analog" signal from machine "C", which is also generated in identical fashion to the "true analog" signal from machine "B". In addition, a constant offset circuit 160 and 162 is inserted in one of the input lines to each of the two comparators 156 and 158 to account for the width of the machines plus a certain safety margin. Comparator 156 is adapted to produce a HI output signal on line 164 whenever the "true analog" signal from machine "B" is less than or equal to the "true analog" signal from machine "A" as adjusted by offset circuit 160. Similarly, comparator 158 is adapted to produce a HI output signal on line 166 whenever the "true analog" signal from machine "B" is greater than or equal to the "true analog" signal from machine "C" as adjusted by offset circuit 162. The two comparator output signals on lines 164 and 166 are provided to an OR-gate 168 which has its output connected to the brake drive assembly of each of the three machines "A", "B", and "C". Thus, if the output of either of the two comparators 156 and 158 goes HI, indicating that two of the machines are about to collide, a stop signal is provided to each of the machine assemblies that is effective to clamp the motive drive system of each machine to prevent further movement along the line.

While the above description constitutes the preferred embodiments of the invention, it will be appreciated that the invention is susceptible to modification, variation and change without departing from the proper scope or fair meaning of the accompanying claims.

What is claimed is:

1. In a closed-loop numerical control system for controlling the movement of a machine assembly including motive drive means, computing means for producing a digital output signal indicative of the desired position of said machine assembly, and encoder means for producing a digital output signal indicative of the actual position of said machine assembly; control circuit means for controlling said motive drive means comprising:

subtractor means responsive to said digital output signals for digitally determining the difference between said desired position and said actual position and producing a digital difference signal in accordance therewith:

analog control means for producing a first control signal in accordance with a predetermined number of the most significant bits in said difference signal that is used to control said motive drive means for large scale differences between said desired position and said actual position;

digital control means for producing a second control signal in accordance with a predetermined number of the least significant bits in said difference signal that is used to control said motive drive means for small scale differences between said desired position and said actual position, said digital control means including a voltage divider network comprising a plurality of parallel connected resistance elements each associated with one of said predetermined number of least significant bits; and selector means for transferring the control of said motive drive means from said analog control means to said digital control means when the value of said difference signal falls below a preselected value.

2. The numerical control system of claim 1 wherein said selector means is adapted to transfer the control of said motive drive means from said analog control means to said digital control means when a predetermined number of the most significant bits in said difference signal are all LO.

3. The numerical control system of claim 2 wherein said selector means includes logic gating means connected to said predetermined number of most significant bits in said difference signal for producing a first selector signal when all of said bits are not LO and a second selector signal when all of said bits are LO.

4. The numerical control system of claim 3 wherein said selector means further includes electronic switch means responsive to said logic gating means for applying said first control signal to said motive drive means in response to the production of said first selector signal and said second control signal to said motive drive means in response to the production of said second selector signal.

5. The numerical control system of claim 1 wherein said analog control means comprises a constant signal source for providing said first control signal and a polarity circuit connected to said signal source for setting the polarity of said first control signal in accordance with the polarity of said difference signal.

6. The numerical control system of the claim 2 wherein said analog control means is responsive to said predetermined number of the most significant bits in said difference signal for producing said first control signal by converting said most significant bits to a corresponding analog signal.

7. The numerical control system of claim 6 wherein said analog control means comprises a digital-to-analog converter for converting said most significant bits to an analog signal and a polarity circuit connected to said digital-to-analog converter for setting the polarity of said analog signal in accordance with the polarity of said difference signal.

8. The numerical control system of claim 1 wherein the values of said plurality of resistance elements reflect the relative binary weights of said least significant bits.

9. The numerical control system of claim 8 wherein said digital control means further includes a corresponding plurality of electronic switching means having their inputs connected in common to a constant signal source and their outputs connected to one of said resistance elements and each being controlled by one of said least significant bits.

10. The numerical control system of claim 9 wherein said digital control means further includes a polarity circuit connected to said constant signal source for setting the polarity of said second control signal in accordance with the polarity of said difference signal.

11. In a closed-loop numerical control system for controlling the movement of a machine assembly including motive drive means, computing means for producing a digital output signal indicative of the desired position of said machine assembly, and encoder means for producing a digital output signal indicative of the actual position of said machine assembly; control circuit means for controlling said motive drive means comprising:
subtractor means responsive to said digital output signal for digitally determining the difference between said desired position and said actual position and producing a digital difference signal in accordance therewith, said subtractor means including a magnitude comparator means for digitally comparing said desired position signal and said actual position signal and producing a first polarity signal when the two signals are of equal magnitude, a second polarity signal when the magnitude of said desired position signal is greater than the magnitude of said actual position signal, and a third polarity signal when the magnitude of said desired position signal is less than the magnitude of said actual position;
analog control means for producing a first control signal in accordance with a predetermined number of the most significant bits in said difference signal that is used to control said motive drive means for large scale differences between said desired position and said actual position;
digital control means for producing a second control signal in accordance with a predetermined number of the least significant bits in said difference signal that is used to control said motive drive means for small scale differences between said desired position and said actual position; and
selector means for transferring the control of said motive drive means from said analog control means to said digital control means when the value of said difference signal falls below a preselected value.

12. The numerical control system of claim 11 wherein said subtractor means further includes binary subtractor means for producing said digital difference signal by subtracting said actual position signal from said desired position signal in response to said second polarity signal and by subtracting said desired position signal from said actual position signal in response to said third polarity signal.

13. The numerical control system of claim 12 wherein said control circuit means further includes means responsive to said first polarity signal for preventing further movement of said machine assembly.

14. In a closed-loop numerical control system for controlling the movement of a machine assembly including motive drive means, computing means for producing a digital output signal indicative of the desired position of said machine assembly, and encoder means for producing a digital output signal indicative of the actual position of said machine assembly; control circuit means for controlling said motive drive means comprising:
subtractor means responsive to said digital output signals for digitally determining the difference between said desired position and said actual position and producing a digital difference signal in accordance therewith;
Analog control means for producing a first control signal in accordance with a predetermined number of the most significant bits in said difference signal that is used to control said motive dirve means for large scale differences between said desired position and said actual position;
digital control means for producing a second control signal in accordance with a predetermined number of the least significant bits in said difference signal that is used to control said motive drive means for small scale differences between said desired position and said actual position;
selector means for transferring the control of said motive drive means from said analog control means to said digital control means when the value of said difference signal falls below a preselected value; and
braking generator means responsive to the least significant bit in said actual position signal for dynamically braking said machine assembly when appropriate to prevent overshoot of said desired position by producing a braking signal in accordance with the rate of change of said least significant bit that is opposite in polarity to said first and second control signals and that is combined with said first and second control signals.

15. The numerical control system of claim 14 wherein said braking generator means is adapted to vary the magnitude of said braking signal in accordance with variations in the rate of change of said least significant bit.

16. The numerical control system of claim 15 wherein said braking generator means includes integration means for integrating said least significant bit signal, and polarity circuit means connected to said integration means and responsive to said difference signal for setting the polarity of said braking signal opposite to the polarity of said difference signal.

17. The numerical control system of claim 16 wherein said braking generator means further includes disconnect means for disconnecting said braking generator means from said digital control means when the magnitude of said braking signal falls below a preselected level.

18. In a closed-loop numerical control system for controlling the movement of a machine assembly including computing means for producing an output signal indicative of the desired position of said machine assembly, encoder means for producing an output signal indicative of the actual position of said machine assembly, control circuit means responsive to said output signals for producing a control signal in accordance with the difference between said output signals, and motive drive means responsive to said control signal for controlling the direction and velocity of said machine assembly in accordance with the polarity and magnitude respectively of said control signal; braking generator means responsive to said actual position output signal for dynamically braking said machine assembly when appropriate to prevent overshoot of said desired position by producing a braking signal in accordance with the rate of change in said actual position output signal that is opposite in polarity to said control signal and that is combined with said control signal to reduce the magnitude thereof and possibly reverse the polarity thereof.

19. The numerical control system of claim 18 wherein said braking generator means is adapted to vary the magnitude of said braking signal in accordance with variations in the rate of change of said actual position output signal.

20. The numerical control system of claim 19 wherein said braking generator means includes integration means for integrating said actual position output signal, and polarity circuit means connected to said integration means and responsive to said control signal for setting the polarity of said braking signal opposite to the polarity of said control signal.

21. In a closed-loop numerical control system for controlling the movement of a machine assembly including motive drive means, computing means for producing a digital output signal indicative of the desired position of said machine assembly, and encoder means for producing a digital output signal indicative of the actual position of said machine assembly; control circuit means for controlling said motive drive means comprising:

subtractor means responsive to said digital output signals for digitally determining the difference between said desired position and said actual position and producing a digital difference signal in accordance therewith;

analog control means for producing a large scale control signal;

digital control means for producing a small scale control signal in accordance with a predetermined number of least significant bits in said difference signal comprising a plurality of electronic switching means each controlled by one of said least significant bits, a voltage divider network comprising a corresponding plurality of parallel connected resistance elements each connected to the output of one of said electronic switching means, and polarity circuit means connected in common to the input of each of said electronic switching means for applying to said inputs a fixed magnitude signal having a polarity equal to the polarity of said difference signal; and selector means for transferring the control of said motive drive means from said analog control means to said digital control means when the value of said difference signal falls below a preselected value.

22. The numerical control system of claim 21 wherein the relative resistance values of said plurality of resistance elements reflect the relative binary weights of said least significant bits.

23. The numerical control system of claim 22 wherein said plurality of resistance elements constitutes one-half of said voltage divider network with the other half thereof consisting of a fixed value resistance.

24. The numerical control system of claim 23 wherein said selector means is adapted to transfer the control of said motive drive means from said analog control means to said digital control means when a predetermined number of the most significant bits in said difference signal are all LO.

25. The numerical control system of claim 24 wherein said control circuit means further includes means for disabling said digital control means whenever said predetermined number of most significant bits in said difference signal are not all LO.

26. The numerical control system of claim 24 wherein said analog control means is responsive to said predetermined number of most significant bits in said difference signal for producing said large scale control signal by converting said most significant bits to a corresponding analog signal.

27. The numerical control system of claim 26 wherein said analog control means comprises a digital-to-analog converter for converting said most significant bits to an analog signal and a polarity circuit connected to said digital-to-analog converter for setting the polarity of said analog signal in accordance with the polarity of said difference signal.

28. The numerical control system of claim 21 wherein said control circuit means further includes braking generator means responsive to the least significant bit in said actual position signal for dynamically braking said machine assembly when appropriate to prevent overshoot of said desired position by producing a braking signal in accordance with the rate of change of said least significant bit that is opposite in polarity to said large scale and small scale control signals and that is combined with said large scale and small scale control signals.

29. The numerical control system of claim 28 wherein said braking generator means is adapted to vary the magnitude of said braking signal in accordance with variations in the rate of change of said least significant bit.

30. The numerical control system of claim 29 wherein said braking signal is combined with said small scale control signal by providing said braking signal to the midpoint of said voltage divider network in said digital control means for varying the effective value of said other half of said voltage divider network.

31. The numerical control system of claim 30 wherein said braking generator means further includes disconnect means for disconnecting said braking generator means from said digital control means when the magnitude of said braking signal falls below a preselected value.

* * * * *